United States Patent [19]

Levine

[11] Patent Number: 4,499,497
[45] Date of Patent: Feb. 12, 1985

[54] CCD IMAGER WITH IMPROVED LOW LIGHT LEVEL RESPONSE

[75] Inventor: Peter A. Levine, Trenton, N.J.

[73] Assignee: RCA Corporation, New York, N.Y.

[21] Appl. No.: 452,914

[22] Filed: Dec. 27, 1982

[51] Int. Cl.³ .............................................. H04N 3/14
[52] U.S. Cl. .................................... 358/213; 358/211
[58] Field of Search .................. 358/213, 167, 36, 211

[56] References Cited

U.S. PATENT DOCUMENTS 4,435,730  3/1984  Bendell et al. ...................... 358/213

Primary Examiner—Gene Z. Rubinson
Assistant Examiner—Robert Lev
Attorney, Agent, or Firm—Joseph S. Tripoli; George E. Haas; Allen LeRoy Limberg

[57] ABSTRACT

At low light levels, the floating diffusion output stage of a CCD imager has the peaks of the reset pulses applied to its reset gate reduced. This introduces spatial integration in the direction of line scan that improves the signal-to-noise ratio of the video samples supplied as imager output.

6 Claims, 5 Drawing Figures

CCD IMAGER WITH IMPROVED LOW LIGHT LEVEL RESPONSE

The present invention relates to CCD imagers using floating diffusion output stages and, more particularly, to resetting the floating diffusion output stages so as to obtain improved response to low light levels.

When operated conventionally, the CCD floating diffusion output is completely reset on each clock cycle to a fixed potential established by the reset drain. The floating diffusion acts a capacitor which is initially charged to the reset drain voltage and subsequently discharged by the incoming charge packet by an amount proportional to the packet size. Then, before the next charge packet is dumped onto the floating diffusion, the floating diffusion is again completely reset to the reset drain potential. Owing to complete reset, there is no memory of previous charge packets. Therefore, the voltage swing obtained at the floating diffusion can only be as large as Q/C, where C is the capacitance at the floating diffusion node and Q is the signal charge contained in a packet. For the case of an imager with many resolution elements, the area of each element is made smaller. This is because of yield and lens format considerations. Therefore, increased resolution results in decreased size of the charge packets associated with individual pixels. The noise voltage against which the signal voltage generated by these reduced-size packets is to be compared, in determining signal-to-nose ratio, comprises as its two primary components the reset noise and the noise of the video amplifier following the floating diffusion. The reset noise at 300 Kelvin is about 400 $(C_{fd})^{\frac{1}{2}}$ electrons where $C_{fd}$ is the capacitance of the floating diffusion. Signal-to-noise ratios are quite severely degraded at low light levels as image resolution is increased.

The present invention is directed to trading off image resolution for improved signal-to-noise performance as light levels are reduced. Spatial integration of the image is used to increase imager sensitivity at reduced light levels, increasing the imager output signal without appreciably increasing attendant noise levels. To achieve increased spatial integration of the image at lower light levels, as the image is described in video signal form, the reset of the floating diffusion is modified so that the portion of the charge that can be transferred from under the floating diffusion upon application of a reset pulse is reduced in inverse relation to the level of that charge.

Figure 1:
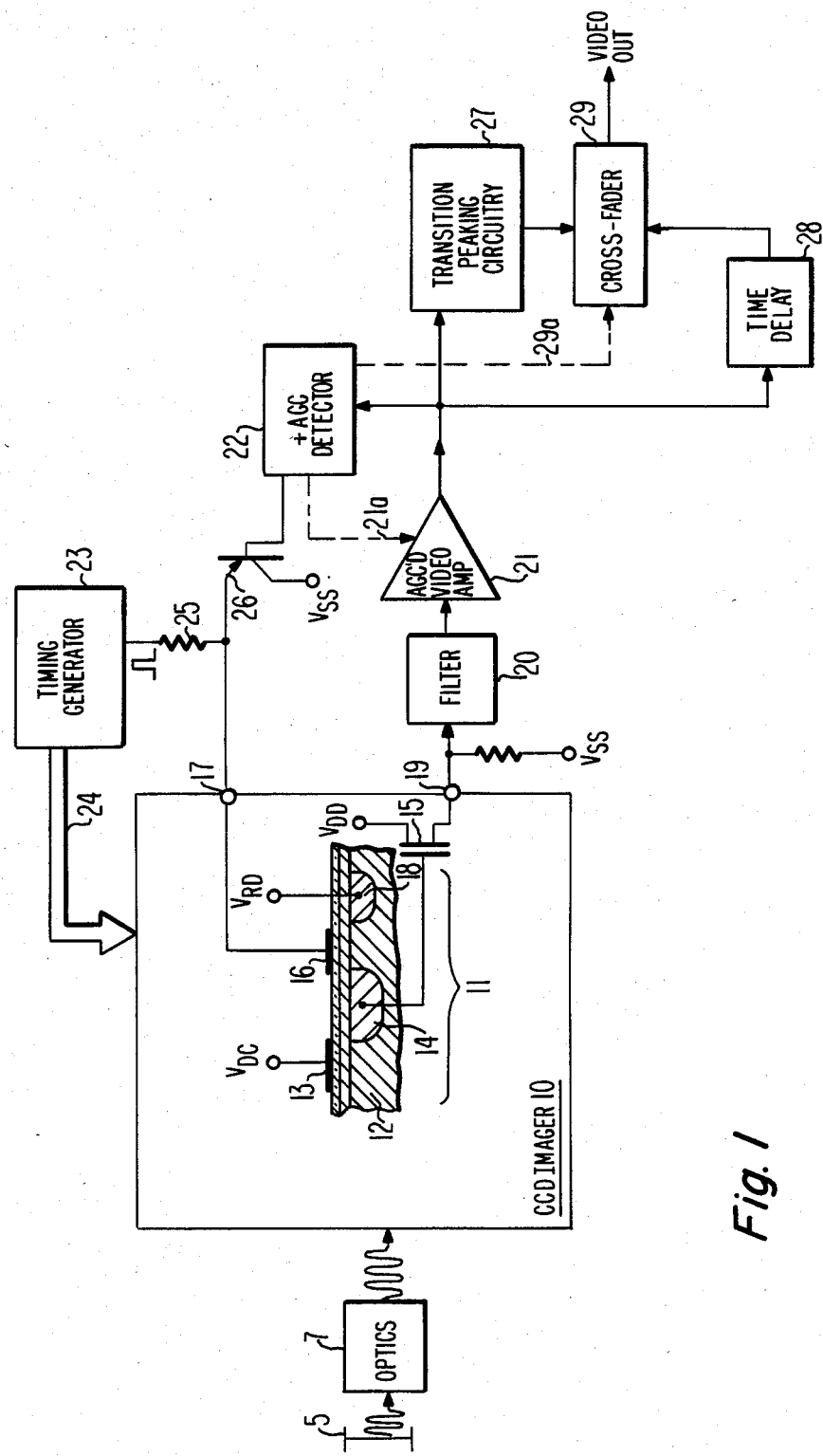
FIG. 1 is a schematic diagram, partially in block form, of a CCD imager system constructed and operated according to the principles of the invention.

FIG. 1 shows a light image 5 being conducted by optics 7 to a CCD imager 10. CCD imager 10 is shown in block, with particulars of its floating diffusion output stage in full circuit schematic within the block. This full circuit schematic includes a section 11 of the end of the buried-channel output register with silicon bulk 12 assumed to be p-type, with an output gate 13 to which a direct voltage $V_{DC}$ establishing a barrier height is applied, with a floating diffusion region 14 connected to the gate of a source-follower field effect transistor (FET) 15, with a reset gate 16 connected to an imager terminal 17, and with a drain region 18 to which a reset drain voltage $V_{RD}$ is applied. $V_{RD}$ is a direct voltage, preferably one that can be adjusted to control the minimum imager output signal level at which full reset of floating diffusion 14 takes place. The CCD imager output signal terminal 19, to which the source of source-follower FET 15 connects, supplies pixel samples of video signal to a filter 20. Filter 20 conventionally includes some low-pass frequency-domain filtering sample-and-hold circuitry sampling at pixel scan rate. Filter 20 may include a dc blocking capacitor. In any case filter 20 responds to the pixel samples to provide a continuous video signal.

In the FIG. 1 apparatus this continuous video signal is applied to an automatically gain-controlled video amplifier 21, which is used to convert a video signal with changing brightness to a video signal of more constant brightness. To this end the output signal from AGC'd video amplifier 21 is applied to an AGC detector 22 that detects the brightness of amplifier 21 output signal to develop an automatic gain control (AGC) signal, assumed to be positive, which is applied via control line 21a to control the gain of amplifier 21 by degenerative feedback. AGC detector 22 may be of a type detecting average brightness, a type detecting peak brightness, or a type detecting a combination of both average and peak brightness. The range of AGC afforded by this loop is limited so amplifier 21 can gain control over a range of differing brightnesses of, say, twenty-six to forty dB. The AGC range should include the levels of video input to amplifier 21 where signal-to-noise is acceptably high without having to accept reduction of the spatial resolution of the image described by the video signal as finally processed.

In the range of operation just described, the timing generator 23, which supplies via bus 24 the various clocking and timing signals required for operating CCD imager 10, supplies positive-going reset pulses at pixel clock rate via a resistor 25 and imager terminal 17 to the reset gate 16. PNP clamp transistor 26 is non-conductive owing to AGC voltages being arranged to be more positive than the positive peak of the reset pulses, so the peak value of these reset pulses is unaffected in their passage through resistor 25 for this range of operation. The peak value is sufficiently positive that the entirety of each charge packet transferred under floating diffusion 14 at pixel sample rate is transferred to the drain region 18 during the time the subsequent reset pulse applied to reset gate 16 causes field effect transistor conduction between floating diffusion 14 as initial source and drain region 18.

As the AGC voltage falls below the value for which AGC'd video amplifier 21 begins to exhibit gain reduction, so that amplifier 21 gain is at its maximum, clamp transistor 26 begins to exert clamping on the peak value of the reset pulses, so that charge transfer from the floating diffusion 14 to drain region 18 during the duration of the reset pulse is slowed. That is, the conduction channel between floating diffusion 14 and drain region 18 induced under reset gate 16 upon application of reset pulse tends to be more resistive as the reset pulse peak is made less positive, and the RC time constant associated with transfer of charge to drain region 18 becomes longer. This means that not all the charge in a charge packet transferred to floating diffusion 14 need be transferred from it on the subsequent reset pulse. The portion of the charge transferred will be related to the size of the charge packet. Larger charge packets tend to bias more negative the virtual source that is provided by floating diffusion 14, in the n-channel field-effect-transistor action with channel between floating diffusion 14 and drain region 18 which occurs when reset gate 16 is pulsed. This forward bias increases the transconductance of the transistor, lowering its channel resistance and thus decreasing the RC time constant associated with transfer of charge from the well under floating diffusion 14. There is thus an introduction of spatial integration in the direction of line scan in the video signal from imager 10, and the amount of integration is most pronounced for small quantity of charge on the floating diffusion 14.

Reset operation wherein all the charge on the floating diffusion 14 (or a similar floating gate) that connects to the electrometer FET 15 gate electrode is drained away to the reset drain region 18 during resetting, as is conventionally done, will be referred to as "hard reset". Reset operation wherein a portion of the charge on the floating element is left behind following each resetting, in accordance with the invention and as described in the preceding paragraph, will be referred to as "soft reset".

Figure 2:
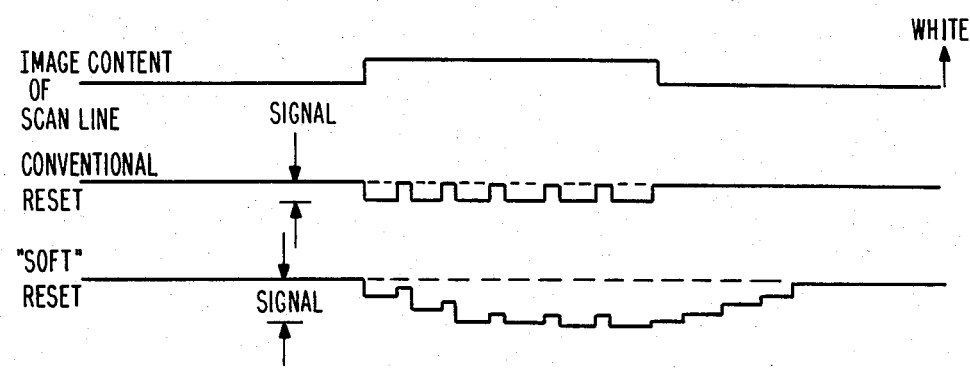
FIG. 2 is a diagram of floating diffusion output stage response when conventionally reset and when reset according to the invention.

FIG. 2 graphs the difference in the voltage responses to a white object in the image scan line (shown at top of figure) of a CCD imager having conventional resetting of its floating diffusion output stage and of a CCD imager having lessened or "soft" resetting of its floating diffusion output stage in accordance with the invention. The former response, shown at middle of figure, and the latter response, shown at bottom of figure, are at output signal terminal 19 of imager 10. Note the increased amplitude of the latter "soft" reset response owing to signal samples being spatially integrated. The spatial integration of the image transitions tends to introduce low-pass filtering that delays transitions in the video signal. This is acceptable in less critical applications, where the video output from AGC'd video amplifier 21 may be used directly, without further processing.

In more critical applications, amplifier 21 video output can be applied to transient peaking circuitry 27, which will, except for time delay, correct the signal for low brightness level, and to time delay circuitry 28, which will introduce corresponding delay into video signals of all brightness levels. A cross-fader 29 can then cross-fade between peaking circuitry 27 output video signal at low brightness levels and delay circuit 28 video output signal at high brightness levels to provide a fully processed video output signal. The cross-fading is shown being controlled by AGC signal supplied to it via control line 29a from detector 22.

The peaking of transitions at low brightness levels makes the noise spectrum triangular, increasing with frequency increase. The human observer of an image recreated from the video signal finds higher-spatial-frequency noise less objectionable than lower-spatial-frequency noise, so a triangular noise spectrum is preferable to a flat noise spectrum for given signal-to-noise ratio.

Figure 3:
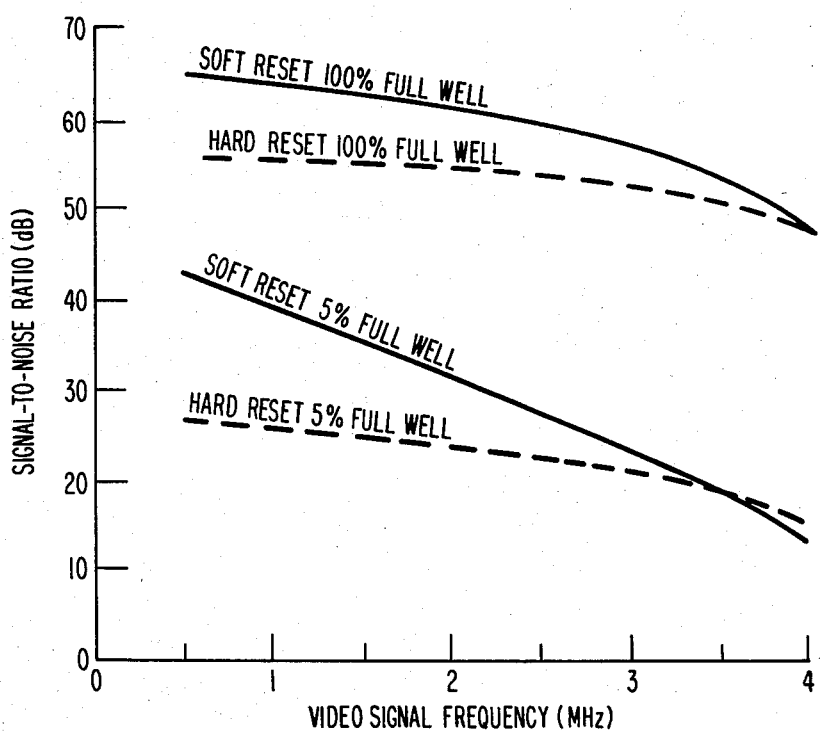
FIG. 3 is a graph of signal-to-noise ratios for the two modes of operation.

FIG. 3 illustrates the differences in signal-to-noise ratio obtainable using conventional "hard" reset and the newly invented "soft" reset of the floating diffusion output stage. The experimental data on which the graphic information is based were obtained using a CCD imager having a 540×512 array of pixels in its image register, into which vertical-bar-pattern images were projected. The peak level of "soft" reset pulses applied to the reset gate was fixed, and tests were made for 100% of full well and 5% of full well. A nine dB improvement at low frequencies is observed for full-well operation. Because of the adaptive transconductance effect in the field effect transistor action of reset, a larger fifteen dB improvement is available at 5% of full well operation.

Figure 4:
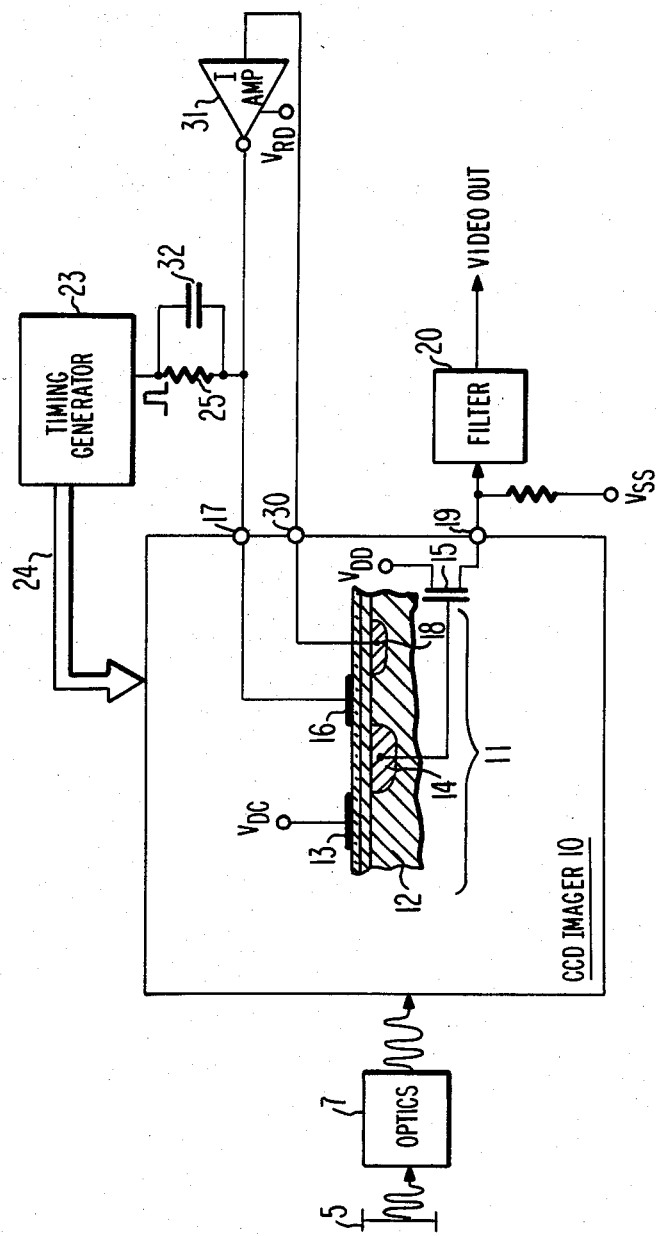
FIGS. 4 and 5 are schematic diagrams, partially in block form, of alternative types of imager system constructed and operated according to the principles of the invention.

FIG. 4 illustrates another way in which the invention may be practiced, which does not clamp reset pulse level responsive to an AGC voltage. The voltage $V_{RD}$ rather than being applied directly to the drain region 18 is applied instead to terminal 30 of CCD imager 10 through a current sensing device, such as the input circuit of a current amplifier 31 which provides drain region 18 a low-resistance path to reset drain voltage $V_{RD}$. Current amplifier 31 may, for example, be an integrated-circuit operational amplifier of the so-called Norton type. The peak of the reset pulse is reduced in inverse relationship to the reset drain current to the input circuit of current amplifier 31, by flowing the output current of amplifier 31 through resistor 25. Capacitor 32 parallels resistor 25 to filter off video signal variations, causing the drop across resistor 25 to be related to average brightness. Variations can be made in the circuitry to relate the drop across resistor 25 to peak brightness rather than average brightness. The output of filter 20 may be gain controlled and processed similarly to the way shown in FIG. 1, if desired.

Figure 5:
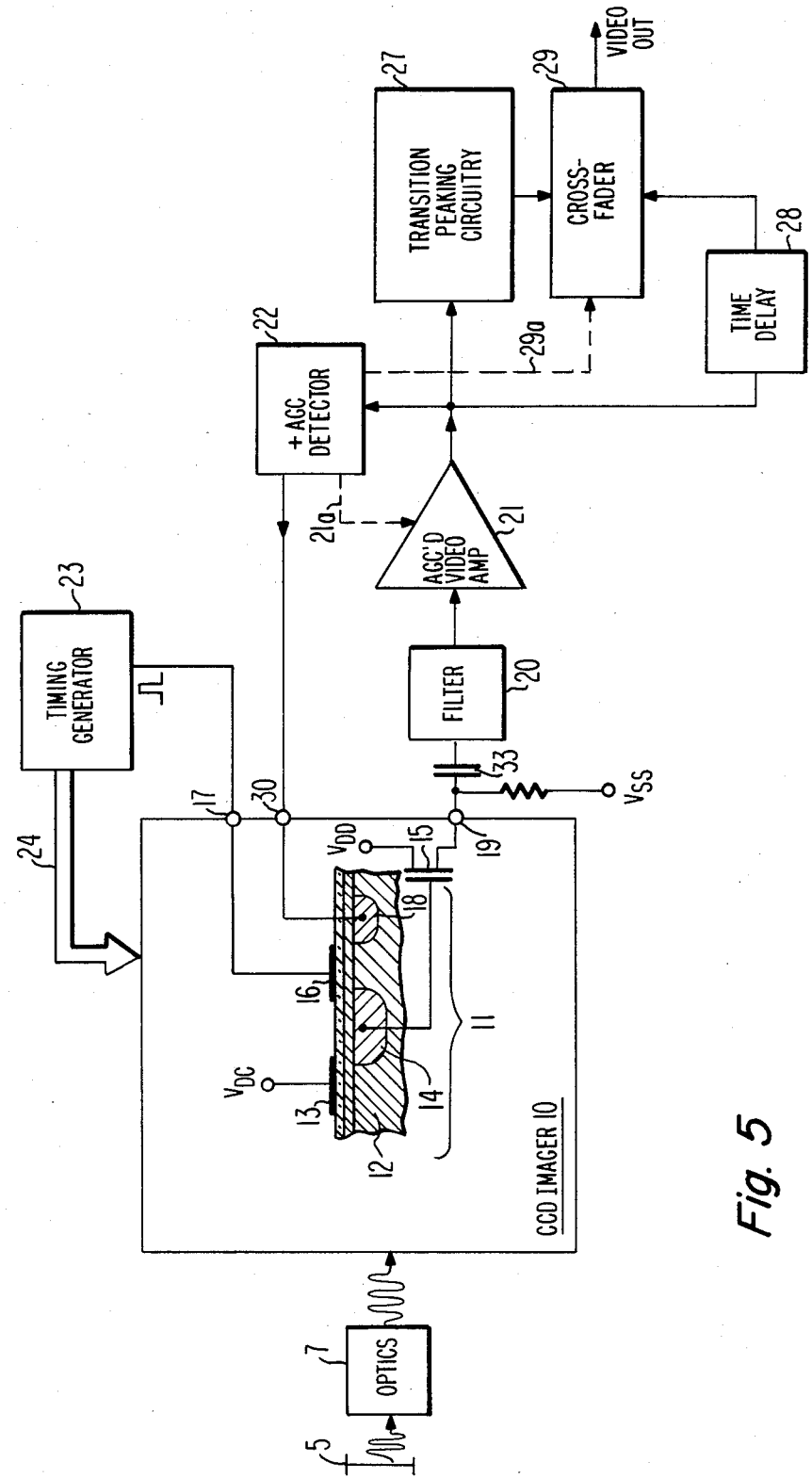

FIG. 5 shows another way in which the invention may be practiced in which the reset pulses applied from timing generator to reset gate 16 via terminal 17 do not vary as a function of light level. Instead the regulation of the degree of reset is effected by varying the voltage applied to the reset drain 18 via terminal 30. This is done in FIG. 5 by reducing the voltage from a value of $V_{DR}$ supplied from an output of AGC detector 22 at high light level to an appropriately less positive voltage at lower light level. This results in a shift in the direct potential level of video output signal supplied at terminal 19 of CCD imager 10, but this is of no substantial consequence where the video signal is a-c coupled anyway—i.e. by inclusion of d-c blocking capacitor 33 in the input to filter 20.

A number of other variations on the apparatuses described above which use the principles of the present invention will readily occur to one skilled in television electronics design, and the scope of the ensuing claims should be construed broadly to include such variations within their scope where possible.

What is claimed is:

1. In the method of operating a CCD imager of the type having a floating diffusion output stage, said method comprising the steps of:

periodically introducing charge packets descriptive of image elements under the floating diffusion;

sensing the potential of the floating diffusion following the introduction of each charge packet; and providing, during reset intervals following each sensing of potential and preceding the next introduction of a charge packet, a conductance path for transfer of charge stored under the floating diffusion to a reset drain-the improvement for providing a video signal with improved signal-to-noise ratio responsive to low light input levels to the imager, which improvement in said method comprises the step of:

reducing the conductance of the path provided during each reset interval for transfer of charge stored under the floating diffusion to the reset drain to such value as to slow the transfer of the charge stored under the floating diffusion to the reset drain during each reset interval in inverse relation to the level of the charge stored under the floating diffusion, whereby there is integration of the charge packets formed in response to low light levels to increase the level of the signal component of sensed potential respective to the noise component thereof.

2. Apparatus for implementing the method of claim 1 comprising:

a CCD imager having a floating diffusion output stage comprising in addition to a floating diffusion, a reset drain, a reset gate, a field effect transistor amplifier with a gate connected to the floating diffusion and a source-to-drain circuit from which CCD imager output signal is supplied;

detector means for detecting the current flow in said reset drain; and reset pulse supplying means for supplying reset pulses to said reset drain having a peak level controlled in response to the output of said detector means.

3. Apparatus for implementing the method of claim 1, comprising:

a CCD imager having a floating diffusion output stage comprising in addition to a floating diffusion, a reset drain, a reset gate, a field effect transistor amplifier with gate connected to the floating diffusion, and a source-to-drain circuit from which CCD imager output signal is supplied;

means for converting the CCD imager output signal to continuous video signal;

a gain-controlled video amplifier having a video signal input circuit to which said continuous video signal is applied, having a gain control signal input circuit, and having a video output signal circuit;

an AGC detector having an input circuit connected to the output circuit of said gain-controlled video amplifier and having an output circuit connected to the gain control signal input circuit of said gain-controlled video amplifier, for completing a feedback loop generating an automatic gain control signal, responsive to a range of higher light levels to said CCD imager for regulating the brightness of video response from said video output signal circuit, said higher light levels being those having an adequate signal-to-noise ratio;

means for applying a direct reset drain voltage to said reset drain; and means for supplying reset pulses to said reset gate, which pulses are of a peak amplitude regulatable by said automatic gain control signal generated responsive to a range of lower light levels to said CCD imager, said lower light levels including those for which improved signal-to-noise ratio is provided.

4. Apparatus as set forth in claim 3 further including:

means responsive to said automatic gain control signal being generated responsive to said range of lower light levels to said CCD imager, for peaking signal transitions in video signal taken from said gain controlled video amplifier output signal circuit.

5. Apparatus for implementing the method of claim 1, comprising:

a CCD imager having a floating diffusion output stage comprising in addition to a floating diffusion, a reset drain, a reset gate, a field effect transistor amplifier with a gate connected to the floating diffusion, and a source-to-drain circuit from which CCD imager output signal is supplied;

means for converting the CCD imager output signal to a video signal;

a gain-controlled video amplifier having a video signal input circuit to which said video signal is applied, having a gain control signal input circuit, and having a video output signal circuit;

an AGC detector having an input circuit connected to the output circuit of said gain-controlled video amplifier and having an output circuit connected to gain control signal input circuit of said gain-controlled video amplifier, for completing a feedback loop generating an automatic gain control signal, responsive to a range of higher light levels to said CCD imager for regulating the brightness of video response from said video output signal circuit;

means for supplying reset pulses of a fixed amplitude to said reset gate; and means for applying to said reset drain a reset drain voltage related over a range of light levels to said automatic gain control signal.

6. Apparatus as set forth in claim 5 further including:

means responsive to said automatic gain control signal being generated responsive to said range of lower light levels to said CCD imager, for peaking signal transitions in video signal taken from said gain controlled video amplifier output signal circuit.

* * * * *